United States Patent [19]

Cregier et al.

[11] Patent Number: 5,258,181

[45] Date of Patent: Nov. 2, 1993

[54] COMPOSITIONS CONTAINING PSYLLIUM

[75] Inventors: Melissa M. Cregier; John A. Colliopoulos, both of Cincinnati, Ohio

[73] Assignee: The Procter & Gamble Company, Cincinnati, Ohio

[21] Appl. No.: 844,341

[22] Filed: Mar. 2, 1992

[51] Int. Cl.⁵ .............................................. A61K 35/78
[52] U.S. Cl. .................................... 424/195.1; 514/24; 514/57; 514/824; 426/74
[58] Field of Search ................. 424/195.1; 514/25, 57, 514/824; 426/74

[56] References Cited

U.S. PATENT DOCUMENTS

| | | | |
|---|---|---|---|
| Re. 32,811 | 12/1988 | Rudin | 424/195.1 |
| 2,278,464 | 4/1942 | Musher | 424/195.1 |
| 3,148,114 | 9/1964 | Fahrenbach et al. | 167/55 |
| 4,089,981 | 5/1978 | Richardson | 426/104 |
| 4,156,021 | 5/1979 | Richardson | 426/104 |
| 4,315,954 | 2/1982 | Kuipers et al. | 426/583 |
| 4,321,263 | 3/1982 | Powell et al. | 424/195 |
| 4,348,379 | 9/1982 | Kowalsky et al. | 424/34 |
| 4,459,280 | 7/1984 | Colliopoulos et al. | 424/35 |
| 4,511,561 | 4/1985 | Madaus et al. | 424/195.1 |
| 4,548,806 | 10/1985 | Colliopoulos et al. | 424/35 |
| 4,551,331 | 11/1985 | Rudin | 424/195.1 |
| 4,565,702 | 1/1986 | Morley et al. | 426/93 |
| 4,568,557 | 2/1986 | Becker et al. | 426/618 |
| 4,619,831 | 10/1986 | Sharma | 426/93 |
| 4,639,367 | 1/1987 | Mackles | 424/45 |
| 4,668,519 | 5/1987 | Dartey | 426/548 |
| 4,673,578 | 6/1987 | Becker et al. | 426/93 |
| 4,678,672 | 7/1987 | Dartey et al. | 426/19 |
| 4,698,232 | 10/1987 | Sheu et al. | 426/572 |
| 4,737,364 | 4/1988 | Kalogris | 424/195.1 |
| 4,747,881 | 5/1988 | Shaw et al. | 106/209 |
| 4,766,004 | 8/1988 | Moskowitz | 476/658 |
| 4,778,676 | 10/1988 | Yang et al. | 424/79 |
| 4,784,861 | 11/1988 | Gori | 426/74 |
| 4,824,672 | 4/1989 | Day | 424/195.1 |
| 4,849,222 | 7/1989 | Broaddus | 424/195.1 |
| 4,871,557 | 10/1989 | Linscott | 426/93 |
| 4,950,140 | 8/1990 | Pflaumer et al. | 424/439 |
| 4,981,698 | 1/1991 | Cherukuri et al. | 426/5 |
| 5,009,916 | 4/1991 | Colliopoulos | 426/615 |

FOREIGN PATENT DOCUMENTS

| | | |
|---|---|---|
| 144644 | 6/1985 | European Pat. Off. . |
| 285201 | 10/1988 | European Pat. Off. . |
| 306469 | 3/1989 | European Pat. Off. . |
| 323666 | 7/1989 | European Pat. Off. . |
| 387933 | 9/1990 | European Pat. Off. . |
| 412604 | 2/1991 | European Pat. Off. . |
| 2430509 | 1/1976 | Fed. Rep. of Germany . |
| 63-264534 | 11/1988 | Japan . |
| 1590507 | 6/1981 | United Kingdom . |

OTHER PUBLICATIONS

Goodman and Gilman, The Pharmacologic Basis of Therapeutics, 6th Edition, 1004 and 1007 (1980).
Garvin et al., Proc. Soc. Exp. Biol. Med., 120, 744–746 (1965).
Forman et al., Proc. Soc. Exp. Biol. Med., 127, 1060–1063 (1968).
Anderson et al., Fed. Proc., 46, 877 (1987).
Anderson et al., Am. J. Gastroenterology, 81, 907–919 (1986).
Fagerberg, Curr. Ther. Res., 31, 166 (1982).
Naturacil ®, sold by Mead Johnson.
Erasmus, Fat and Oils (1986), by Alive Vancouver Canada, p. 204 Eat'n Lose ® (Peanut Butter) Nutrition Bars, distributed by CCA Industries Inc.

*Primary Examiner*—John W. Rollins
*Attorney, Agent, or Firm*—D. C. Mohl; K. W. Zerby; J. D. Schaeffer

[57] ABSTRACT

The present invention relates to compositions comprising psyllium fiber and peanut paste, and the use of these compositions as laxatives and/or for cholesterol reduction benefits. The compositions are a convenient, portable, highly palatable, and well tolerated dosage form for administering psyllium fiber.

16 Claims, No Drawings

COMPOSITIONS CONTAINING PSYLLIUM

BACKGROUND

The present invention relates to novel compositions containing psyllium and peanut paste. The compositions have excellent texture, mouthfeel and palatability, and are well tolerated by the gastrointestinal tract. They are useful as dietary aids in the control of bowel function (including use as laxatives) and/or for reducing blood cholesterol levels and/or for weight control or other indications where fiber may be beneficial.

Several U.S. patents describe non-baked compositions in which psyllium is an optional or essential ingredient: U.S. Pat. No. 4,778,676, to Yang et al., issued Oct. 18, 1988 (describes chewable compositions comprising a precoated active and a confectionery matrix); U.S. Pat. No. 4,766,004, to Moskowitz, issued Aug. 23, 1988 (describes dietary fiber supplement compositions comprising whole psyllium husks having a particle size of from 12 to 70 mesh, food grade vegetable fat which is a solid at room temperature, sweetening agent and flavoring agent); U.S. Pat. No. 4,737,364, to Kalogris, issued Apr. 12, 1988 (describes low calorie dry food concentrate); U.S. Pat. No. 4,698,232, to Sheu et al., issued Oct. 6, 1987 (describes fiber-containing confectionery compositions comprising dietary fiber pretreated with a lubricant, a foamed matrix, and an amorphous matrix); and U.S. Pat. No. 4,551,331, to Rudin, issued Nov. 5, 1985 and R. E. 32,811, issued Dec. 27, 1988 (describe dietary fiber products comprising a dietary fiber coated with a food grade emulsifier). Peanut Butter Ultra Eat'n Lose ® Nutrition Bars (sold by CCA Industries, Inc.) is said to be a peanut butter coated and containing, high fiber and mineral supplemented nutrition bars wherein the fiber component is a mixture of brans (e.g., corn, oat, wheat) and other fibers, including a low amount of psyllium. Naturacil ® (sold by Mead Johnson) is an artificial chocolate flavored, caramel-like laxative product containing psyllium; the ingredients listed for this product include sugar, glycerin, nonfat milk, and partially hydrogenated vegetable oil.

U.S. Pat. No. 4,784,861, to Gori, issued Nov. 15, 1988, describes powders formed of a mixture of oat, wheat and corn bran mixed with pectin, guar gum, psyllium and cutin to which mineral supplements have been added. U.S. Pat. No. 4,619,831, to Sharma, issued Oct. 28, 1986, describes dietary fiber products comprising insoluble dietary fiber (92-98.5%) coated or enrobed with soluble dietary fiber (1.5-8%; psyllium is mentioned as one of many soluble fibers). U.S. Pat. No. 4,565,702, to Morley et al., issued Jan. 21, 1986, describes dietary fiber compositions comprising dietary fibers which are insoluble fibers coated with soluble fiber. U.S. Pat. No. 4,348,379, to Kowalsky et al., issued Sep. 7, 1982, describes dietetic compositions comprising psyllium seed, linseed, and wheat bran. European Patent Application Publication No. 144,644, published Jun. 19, 1985 by G. D. Searle and Co., describes high fiber food compositions comprising psyllium and other dietary fiber sources.

West German Patent Specification 2,430,509, published Jan. 15, 1976 by hypolab S. A., Genf. (Schweiz), describes preparing compositions containing bulk laxatives (including psyllium mucilloid) in the form of a cake. The cake dough is prepared and baked in molds to produce cakes having thickness of 3-6 mm.

U.S. Pat. Nos. 4,568,557, issued Feb. 4, 1986, and 4,673,578, issued Jun. 16, 1987, both to Becker et al., describe a high dietary fiber-containing snack food product. The product is said to comprise from about 5% to about 30% by weight of dietary fiber, soaked in a food grade oil, for example admixed with peanut butter such that the peanut oil becomes absorbed by the fiber, and further mixed with a compound coating.

Reduced calorie baked cookies containing microcrystalline cellulose as a preferred bulking agent are disclosed in U.S. Pat. No. 4,668,519, to Dartey et al., issued May 26, 1987. This patent indicates that these cookies can optionally include bulking agents such as dietary fibers (including psyllium fiber) at levels up to about 10% by weight of the dough.

Great Britain Patent Specification 1,590,507, published Jun. 3, 1981, by Syntex (U.S.A.) Inc., describes compositions comprising mixtures of purified cellulose and pectin as a source of dietary fiber. The effectiveness of these compositions for controlling fecal output in humans is compared versus various other compositions, including biscuits which comprise only psyllium.

Other documents include: U.S. Pat. No. 4,321,263, to Powell et al., issued Mar. 23, 1982; U.S. Pat. No. 4,511,561, to Madaus et al., issued Apr. 16, 1985; U.S. Pat. No. 3,148,114, to Fahrenbach et al., issued Sep. 8, 1964; U.S. Pat. No. 4,639,367, to Mackles, issued Jan. 27, 1987; Goodman & Gilman, The Pharmacologic Basis of Therapeutics, Sixth Edition, 1004 and 1007 (1980); Garvin et al., *Proc. Soc. Exp. biol. Med.*, 120, 744–746 (1965); Forman et al., *Proc. Soc. Exp. Biol. Med.*, 127, 1060–1063 (1968); Anderson et al., *Fed. Proc.*, 46, 877 (1987); Anderson et al., *Am. J. Gastroenterol.*, 81, 907–919 (1986); and Faberberg, *Curr. Ther. Res.*, 31, 166 (1982).

In spite of the large amount of research aimed at developing portable and palatable composition containing psyllium, there is a continuing need to provide compositions having psyllium at levels high enough to provide therapeutic benefits in reasonably sized, portable compositions having good eating aesthetics and/or tolerance by the gastrointestinal tract. It is clear from the prior research, such as that described in the above-noted literature, that the search for such compositions could take many different paths; some may or may not satisfy this continuing need. It has been discovered, however, that such compositions can be prepared in bar form comprising psyllium and peanut paste. It has also been discovered that such compositions greatly enhance the eating quality and aesthetics for psyllium fiber, especially with regard to the stickiness of the composition (i.e., the tendency of the composition to stick to and/or form an unpleasant coating on the teeth and/or impaction in teeth during ingestion). Furthermore, such compositions are well tolerated by the gastrointestinal tract and provide relatively low calories per dose.

It is an object of the present invention to provide compositions which are convenient, portable and highly palatable (e.g., having excellent texture and mouthfeel) psyllium-containing compositions. An object of the present invention is also to provide convenient, portable psyllium-containing compositions having good consumer acceptance to promote compliance with a regimen for providing Taxation benefits and/or reducing serum cholesterol levels. A further object is to provide psyllium-containing compositions having little or no gummy or rubbery texture and reduced stickiness during ingestion. Also, an object is to provide portable psyllium-containing compositions which may comprise high concentrations of psyllium fiber and which are efficacious for providing Taxation benefits and/or reducing serum cholesterol levels.

These and other objects of the present invention will become readily apparent from the detailed description which follows.

All percentages and ratios used herein are by weight, and all measurements are made at 25° C., unless otherwise specified.

SUMMARY OF THE INVENTION

The present invention relates to highly palatable psyllium-containing compositions. These compositions comprise: from about 10% to 50% psyllium fiber; from about 5% to about 80% peanut paste; and from about 0% to about 85% carrier materials suitable for ingestion. Furthermore, the compositions preferably have water activities ("Aw") within the range of from about 0.1 to about 0.8.

The present invention further relates to methods for reducing serum cholesterol levels, and for providing Taxation and regulating bowel function. These methods comprise orally administering to a human in need of such treatment a safe and effective amount of a psyllium-containing composition of the present invention.

DETAILED DESCRIPTION OF THE INVENTION

Psyllium-Containing Compositions:

The present invention relates to compositions containing psyllium in unit dosage form. These compositions comprise: (a) psyllium; (b) peanut paste; and (c) preferably, carrier materials suitable for ingestion (preferably sugars and/or humectants and/or flavorants). Further, these compositions preferably have low water activities ("Aw"). The components for use in the present compositions, and the preferred amounts to be utilized, are described in detail hereinafter.

(a) Psyllium Fiber

The present compositions comprise psyllium fiber. The term "psyllium fiber", as used herein, means the seed coat or "husk" of psyllium seed (either intact or macerated or otherwise comminuted).

Psyllium fiber comes from psyllium seed, from plants of the *Plantago* genus. Various species such as *Plantago lanceolate*, *P. rugelii*, and *P. major*, are known. Commercial psyllium includes the French (black; *Plantago indica*), Spanish (*P. psyllium*) and Indian (blonde; *P. ovata*). Indian (blonde) psyllium is preferred for use herein.

Intact or macerated seeds can be used in the practice of this invention. However, it is typical to remove the seed coats from the rest of the seed by, for example, slight mechanical pressure, and then to use only the seed coat. In the practice of the present invention it is convenient and desirable to use macerated seed coat. The seed coat is therefore preferably removed and sanitized by methods known in the art prior to use in the present compositions. For example, the psyllium husk may be sanitized by ethylene oxide or, preferably, by superheated steam (as described in U.S. Pat. No. 4,911,889, issued Mar. 27, 1990 to Leland et al., incorporated herein by reference in its entirety). Furthermore, the psyllium fiber preferably has high purity, being about 85% to about 100% pure, and more preferably being about 95% to about 100% pure.

The compositions of the present invention comprise from about 10% to about 50% psyllium fiber, preferably from about 10% to about 40% psyllium fiber, and more preferably from about 15% to about 30% psyllium fiber, by weight of the compositions.

(b) Peanut Paste

The present invention also comprises peanut paste which is prepared by finely grinding peanuts. Peanut paste is commercially available, being sold, for example, by Krema Products Company, Columbus, Ohio.

Compositions of the present invention typically comprise from about 5% to about 80% peanut paste, preferably from about 5% to about 40% peanut paste, and more preferably from about 5% to about 20% peanut paste, by weight of the psyllium-containing compositions.

(c) Carrier Materials Suitable for Ingestion

The compositions of the present invention may further comprise other components compatible with the psyllium and peanut paste, and which are suitable for ingestion. In particular, such components must not significantly reduce the therapeutic efficacy of the psyllium for the therapeutic uses described herein (especially taxation and/or cholesterol reduction). Compositions of the present invention typically comprise from 0% to about 85% of one or more carrier materials suitable for ingestion, preferably from about 20% to about 85% and more preferably from about 30% to about 80% by weight of the compositions.

The present compositions preferably comprise a sweetening agent in addition to any sweetening agent provided as part of the peanut paste. This includes water-soluble sweetening agents such as monosaccharides, disaccharides, and polysaccharides such as xylose, ribose, glucose, mannose, galactose, fructose, dextrose, sucrose, maltose, partially hydrolyzed starch or corn syrup solids and sugar alcohols such as sorbitol, xylitol, mannitol and mixtures thereof. Sugar components also include materials such as invert sugar syrups, brown sugar, honey, molasses, maple syrup and the like. Sugar components may also be very fine particle size sucrose and/or fructose, and/or corn syrup solids, such as powdered (10X) sugar.

For purposes of the present invention, it is possible to use a non-nutritive artificial sweetener (e.g., aspartame, sold as Nutrasweet's ® brand sweetener by G. D. Searle; saccharin; cyclamate) for some or all of the sweetening agent component of the carrier material. This is particularly preferred when the present composition is to be taken by persons on a restricted caloric diet, or is to be taken for extended periods of time.

Examples of artificial sweeteners include saccharin, cyclamate, acesulfame K (American Hoechst), Gem Sweet (Cumberland Packing Corp.), L-sugars (Lev-O-Cal Biospherics), Hernandulcin (University of Ill.), alitame (Pfizer), Thaumatins, trichloro sucrose, Rebaudioside A, L-aspartyl-L-phenylalanine methyl ester, aspartyl-D-valine isopropyl ester, aspartyl amino malonates, dialkyl aspartyl aspartates, stevioside, glycyrrhizin, p-phene-tylurea, 5-nitro-2-propoxyaniline and neohesperidin dihydrochalcone. The term L-aspartyl-L-phenylalanine methyl ester and methyl L-aspartyl-L-phenylalanine are used interchangeably and correspond to the compound also known as aspartame. Preferred artificial sweeteners are saccharin, cyclamate, acesulfame K, and especially aspartame.

The compositions of the present invention preferably comprise from about 1% to about 65% of such additional sweetening agents, and more preferably from about 10% to about 40% of such sweetening agents by weight of the compositions.

The present compositions also preferably comprise a humectant, preferably glycerin which also provides benefits as a mixing aid and helps keep the Aw of the compositions lower. Food grade quality glycerin is commercially available. Glycerin preferably comprises from about 1% to about 20% of the present compositions, and preferably from about 5% to about 15%.

The present compositions also optionally comprise other dietary fiber, preferably insoluble dietary fiber. The term "insoluble dietary fiber", as used herein, means the water insoluble, substantially non-swellable component of fiber material safe for human ingestion which is non-digestible and non-metabolizable by humans.

A wide range of materials containing insoluble dietary fiber may be used in the present invention. Preferred are cereal brans and mixtures thereof, due to their relatively high content of insoluble dietary fiber. Also preferred is that these cereal brans comprise at least about 75% of the insoluble dietary fiber. Brans preferred include those selected from the group consisting of wheat, corn, barley, rye, oats, rice, soybean, beets, and mixtures thereof. Most preferred are oat, wheat, or corn. The components of the insoluble dietary fiber from these cereal brans are known to be cellulose, hemicellulose and lignin.

Compositions of the present invention containing insoluble dietary fiber typically comprise from about 1% to about 20% of an insoluble dietary fiber, and preferably from about 5% to about 10% insoluble dietary fiber, by weight of the compositions.

Other optional components which may be included are milk products such as whole milk, skim milk, buttermilk, whey, concentrated milk product (condensed or evaporated milk), dried milk products, nonfat milk powder, dry whole milk, modified whole milk and the like, egg products, including egg whites and egg yolks, protein sources (e.g., soy protein), spices, cocoa powder, flavorants such a vanilla, salt, color additives, preservatives (preferably sorbic acid), polyhydric alcohols such as glycerol and propylene glycol, emulsifiers such as lecithin or modified lecithin, antioxidants such as ascorbic acid and alpha-tocopherol, and the like. It is also possible to coat the psyllium-containing compositions of the present invention with a variety of confectionary coating materials. Preferred is coating the entire composition (i.e., enrobing) with from about 10% to about 30% of a coating material, preferably a confectionery coating material, by weight of the final coated composition.

Furthermore, other pharmaceutical active agents may be included as desired into the composition. Such actives include, for example, sennosides, analgesics, cholesterol reduction agents etc. A preferred optional active for inclusion in the present compositions are sennosides. Sennosides are plant-derived compounds that belong to the anthraquinone group of stimulant laxatives. Sennosides are derived from the leaves or pods of various species of the Cassia plant. Commercial sources include the species *Cassia angustifolia* (Tinnevelly senna) and *Cassia acutifolia* (Cassia senna or Alexandria senna). Commercially, sennosides are available as pods, leaves, or concentrates of the leaves and/or pods, and therefore, as used herein, sennoside includes not only the pure or concentrated sennoside compounds having laxative properties but also senna plant materials which have laxative properties. Frequently sold concentrates range from 20-95% calcium sennosides. The remaining components in the concentrate also originate from the plant, or are formed during extraction. Sennosides supplied from concentrates of senna pods are preferred. Such concentrates have ranges of sennoside content typically from about 20% to about 80%. Obviously, the higher the sennoside level in such concentrates, the less concentrate needed for laxative compositions. Sennosides are also described in detail in *The Merck Index*, 10th Edition (1983), No. 8298 ("Senna") and No. 8299 ("Sennoside A&B") and in "Proceedings, First International Symposium on Senna", *Pharmacology*, 36, Suppl. 1 (Karger; 1988), incorporated by reference herein in their entirety.

The laxative compositions of the present invention may comprise a safe and effective amount of sennosides, typically from about 0.01% to about 5%, and preferably from about 0.1% to about 1% by weight of the laxative composition.

In addition, mainly for storage stability purposes, the compositions of the present invention are preferably formulated to have water activities ("Aw") in the range of about 0.1 to about 0.8, preferably from about 0.2 to about 0.5. Levels above this range are generally not desirable unless consumption is to occur within a relatively short time after preparation. Levels below this range are generally perceived as giving too dry a mouthfeel. Aw is a well-known property in the art (see, for example, "Water Activity and Food" by Troller and Christian (Academic Press, N.Y.; 1978) incorporated by reference herein in its entirety) and Aw can be measured by commercially available instruments.

Finally, the compositions of the present invention are in unit dosage forms. Typically, these unit dosage forms are bars or wafers, generally prepared by forming or molding the compositions into the desired form. These unit dosage forms are generally of a size and shape suited for ingesting by chewing, so as to administer the therapeutically effective amount of psyllium by a minimum number of dose units.

Method of Treatment

The present invention also relates to a method for providing Taxation and regulating bowel function for a human in need of such treatment. This method comprises administering to a human in need of such treatment a safe and effective amount of a psyllium-containing composition of the present invention. Ingestion of from about 2.5 grams to about 30 grams per day of the psyllium fiber in a composition according to the present invention is appropriate in most circumstances to produce Taxation. However, this can vary with the size and condition of the patient, and such matters will, of course, be apparent to the attending physician. However, since the psyllium material is nontoxic, even higher ingestion levels can be used without undue side effects. A typical dose for Taxation purposes involves administering from about 3 to about 15 grams of psyllium fiber in one dose.

The present invention further relates to methods for reducing serum cholesterol levels in humans. These methods comprise orally administering to a human in need of having a lowered blood cholesterol level a safe and effective amount of a psyllium-containing composition of the present invention. Ingestion of compositions of the present invention comprising amounts sufficient to administer from about 2.5 grams to about 30 grams per day of psyllium fiber, preferably from about 5 grams to about 15 grams, is appropriate in most circumstances. However, this can vary with the size and condition of the patient, and the patient's blood cholesterol level. Such matters will, of course, be apparent to the attending physician. However, since the psyllium material is nontoxic, even higher ingestion levels can be used without undue side effects, keeping in mind the materials herein have the hereinbefore noted laxative effect.

Treatment of the patient to reduce serum cholesterol levels comprises chronic ingestion in order to lower and maintain the lowered cholesterol levels. Daily ingestion is preferred, and a daily ingestion of from about 5 grams to about 15 grams of the psyllium fiber is most commonly used, with said ingestion preferably being at 2 or 3 regularly spaced intervals throughout the day. Again, depending on the patient's size and cholesterol level in the patient's blood, this can be varied.

The following example further describes and demonstrates an embodiment within the scope of the present invention. The example is given solely for the purpose of illustration and is not to be construed as limitations of the present invention as many variations thereof are possible without departing from the spirit and scope.

EXAMPLE

| Ingredients | Weight % |
| --- | --- |
| Psyllium($^1$) | 23.35 |
| Peanut Paste | 10.50 |
| Corn Syrup | 17.09 |
| Dextrose | 12.08 |
| Glycerin | 9.55 |
| Crisped Rice | 5.00 |
| Peanut Butter Flavor | 0.80 |
| Sorbitol, Crystaline | 21.23 |
| Salt | 0.40 |
| Chocolate Coating | — |

($^1$)Steam sanitized psyllium fiber (95% purity).

This composition is prepared by the following procedure. To a warm double arm mixer is added the corn syrup, salt, peanut paste, glycerin, and peanut flavor which is mixed until well blended. Next is added the sorbitol, dextrose, crisped rice and psyllium and mixed. This dough is then extruded into bars weighing approximately 15 grams each, which are subsequently enrobed with the chocolate coating. The final coated product weighs approximately 18 grams and has an Aw of about 0.3.

Ingestion of one piece of this product delivers 3.4 grams of psyllium to provide a Taxation benefit.

What is claimed is:

1. A pharmaceutical composition comprising:
   (a) from about 10% to about 50% psyllium fiber;
   (b) from about 5% to about 80% peanut paste; and
   (c) from about 0% to about 85% carrier materials suitable for ingestion; and
wherein further said composition is in unit dose forms containing psyllium fiber in amounts effective for providing laxation by a minimum number of dose units.

2. The composition according to claim 1 comprising from about 20% to about 85% carrier materials suitable for ingestion, and wherein further said carrier materials comprise one or more ingestible materials selected from the group consisting of glycerin, sweetening agents, flavorants, preservatives, and mixtures thereof.

3. The composition according to claim 2 wherein the carrier materials comprise from about 1% to about 20% glycerin by weight of the composition.

4. The composition according to claim 3 wherein the carrier materials further comprise from about 1% to about 65% of one or more sweetening agents by weight of the composition.

5. The composition according to claim 4 having an Aw within the range of from about 0.1 to about 0.8.

6. The composition according to claim 1 further comprising a safe and effective amount of sennosides to provide laxation.

7. A pharmaceutical composition comprising:
   (a) from about 10% to about 40% psyllium fiber;
   (b) from about 5% to about 40% peanut paste; and
   (c) from about 20% to about 85% of carrier material suitable for ingestion selected from the group consisting of glycerin, sweetening agents, flavorants, preservatives, and mixtures thereof; and
wherein further said composition is in unit dose forms containing psyllium fiber in amounts effective for providing laxation by a minimum number of dose units.

8. The composition according to claim 7 comprising from about 5% to about 15% glycerin, and said composition has an Aw within the range of from about 0.1 to about 0.8.

9. A pharmaceutical composition comprising:
   (a) from about 15% to about 30% psyllium fiber;
   (b) from about 5% to about 20% peanut paste;
   (c) from about 5% to about 15% glycerin; and
   (d) from about 30% to about 80% of carrier material suitable for ingestion selected from the group consisting of glycerin, sweetening agents, flavorants, preservatives, and mixtures thereof, and wherein said carrier material comprises from about 10% to about 40% of one or more sweetening agents by weight of the composition; and wherein further said composition has an Aw within the range of from about 0.2 to about 0.5; and
wherein further said composition is in unit dose forms containing psyllium fiber in amounts effective for providing laxation by a minimum number of dose units.

10. The composition according to claim 9 further comprising from about 0.1% to about 1% of sennosides.

11. The composition according to claim 10 further coated with from about 10% to about 30% of a confectionery coating.

12. A method for providing laxation and regulating bowel function in a human, said method comprising administering to a human in need of such treatment a safe and effective amount of a psyllium-containing composition according to claim 1.

13. A method for providing laxation and regulating bowel function in a human, said method comprising administering to a human in need of such treatment a safe and effective amount of a psyllium-containing composition according to claim 7.

14. A method for providing laxation and regulating bowel function in a human, said method comprising administering to a human in need of such treatment a safe and effective amount of a psyllium-containing composition according to claim 9.

15. A method for reducing serum cholesterol levels in a human, said method comprising administering to a human in need of such treatment a safe and effective amount of a psyllium-containing composition according to claim 1.

16. A method for reducing serum cholesterol levels in a human said method comprising administering to a human in need of such treatment a safe and effective amount of a psyllium-containing composition according to claim 9.

* * * * *